United States Patent [19]

Lewis et al.

[11] Patent Number: 4,767,431

[45] Date of Patent: Aug. 30, 1988

[54] PRODUCTION OF MICRO GLASS FIBERS

[75] Inventors: Albert Lewis, Covina, Calif.; Cenek A. Kottnauer, West Vancouver, Canada

[73] Assignee: Glass Incorporated International, Chino, Calif.

[21] Appl. No.: 19,237

[22] Filed: Feb. 26, 1987

[51] Int. Cl.$^4$ .............................................. C03B 37/04
[52] U.S. Cl. ............................................. 65/6; 65/335
[58] Field of Search ......................... 65/6, 14, 29, 335

[56] References Cited

U.S. PATENT DOCUMENTS

| | | | |
|---|---|---|---|
| 2,594,799 | 4/1952 | Powell | 65/6 |
| 3,077,092 | 2/1963 | Pyches et al. | 65/6 |
| 3,238,028 | 3/1966 | Simmers | 65/14 |
| 3,265,483 | 8/1966 | Garrison et al. | 65/14 |
| 3,395,005 | 7/1968 | Stelmah | 65/6 X |
| 3,662,293 | 11/1971 | Firnhaber | 65/14 |
| 4,353,724 | 10/1982 | Houston | 65/6 X |

Primary Examiner—Robert L. Lindsay
Attorney, Agent, or Firm—Boniard I. Brown

[57] ABSTRACT

In this energy efficient process for forming glass microfibers, glass pellets are fed at a controlled rate into a rotary fiberizer. The input material is in the form of glass marbles or pellets which are held at a temperature below the liquidus temperature of the glass prior to extrusion through the holes in the fiberizing disc. Centrifugal force causes the semi-soft glass pellets to flow outwardly through the orifices in the fiberizing disc wherefrom they are extruded past the exterior of the disc into a high temperature environment where the temperature of the extruded glass fibers increases and the fibers are additionally subjected to further attenuation of their diameter by the action of a relatively high velocity gaseous stream which acts to stretch out the extruded fibers.

11 Claims, 1 Drawing Sheet

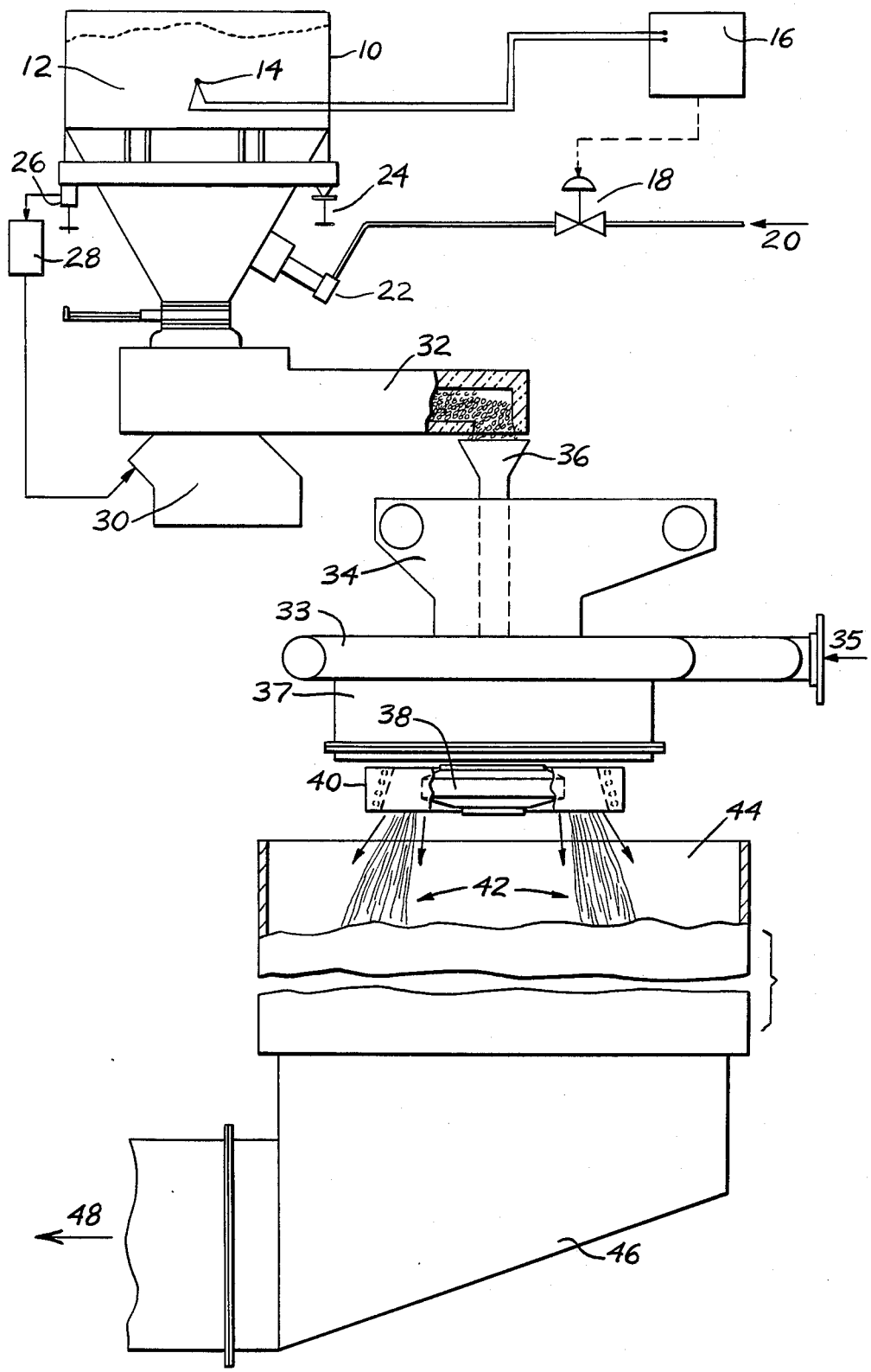

PRODUCTION OF MICRO GLASS FIBERS

BACKGROUND OF THE INVENTION

This invention relates to processes for forming glass fibers. More particularly, this invention relates to methods for forming ultrafine glass fibers using spinner disc techniques in combination with a relatively low input feed temperature of glass into the fiberizing disc and a temperature above the liquidus temperature of the glass outside of the fiberizing disc.

One of the more usual methods for producing glass fibers is by the so-called rotary or centrifugal process. In the rotary process, a molten stream of glass is deposited on a rapidly rotating rotor which has at its periphery a rim with a plurality of openings formed therein through which the molten glass issues in the form of filaments. As the filaments issue from the openings at the rotary periphery, they are subjected to the action of a high velocity, high temperature gaseous blast to attenuate the filaments into fine diameter fibers. A typical reference describing this process is U.S. Pat. No. 3,190,736. The spinner disc normally will have a solid bottom and a vertical, peripheral wall which contains a multiplicity of small orifices. The glass is always in a liquid state as it enters the fiberizer, and in this process it is critical that the glass passes through the orifices in the disc at a temperature well above the point of devitrification of the glass will occur. In the normal process, if the glass begins to crystalize, it will plug the orifices in the fiberizing disc. Therefore, the prior art rotary method for glass fiber protection requires that the input glass material to the spinner disc be in a molten state, a temperature well above the liquidus temperature of the glass material.

Another associated technology is the so-called flame attenuation technology. In this technique, the action of a high temperature gas stream upon extruded glass rods causes the heating and stretching of the rods such that glass fibers of a desired diameter are formed. Detailed explanations of this technology may be found in U.S. Pat. No. 2,607,075, assigned to Owens Corning, and U.S. Pat. Nos. 2,863,176 and 2,994,916, assigned to Johns Manville. Therein the extrusion of the primary filaments is limited to a single row. As such, this process is very inefficient from the standpoint of energy expenditure necessary to stretch out a single row of glass rods. Nevertheless, flame attenuated fiber has good qualities which are unequalled by fibers made from standard rotary techniques. However, the cold and brittle primary glass rod sometimes will prematurely break and cause the formation of "shot." This is, of course, a disadvantage to the flame attenuation process. The rotary technology, on the other hand, allows the production of a shot free fiber at energy consumption several times lower than required for flame attenuation. The standard rotary technology produces a relatively course glass fiber which is quite useful for insulating and acoustical purposes.

SUMMARY OF THE INVENTION

In the present process, the input glass material enters the fiberizer and spinner disc in a semi-rigid state in the form of small marbles, pellets, gobs, cublets, frit or the like. These pellets may be preheated to minimize the energy costs of changing the glass pellets into a semi-soft state as they enter into the fiberizing disc. If not, the heat conducted from the outside of the disc to the interior of the disc will cause the glass pellets to achieve this semi-soft state. Nevertheless, the temperature of the glass at this point is still well below the liquidus temperature. The centrifugal force acting upon the semi-soft glass within the spinner disc will then cause the glass to be extruded out through the orifices in the heated wall of the disc. Although technically it is the inertia of the pellets which causes them to flow through the orifices, the term centrifugal force will be used for convenience.

The temperature of the glass and the interior of the disc is at a point where the speed of crystal growth (devitrification) of the glass is insignificant, thereby minimizing any problems of buildup of glass within the orifices or the interior of the disc. Also, the low temperature of the disc has the desirable effect of markedly increasing the service life of the disc. The exterior peripheral surface of the disc itself is heated by both a high frequency heater and by an annular attenuation burner.

As the semi-rigid rods of glass (primary fibers) are extruded, they are subjected to the downward force of a high temperature blast of gas from the attenuation burner. This causes the rods of glass to rapidly increase in temperature, to soften, and also to be stretched, thereby decreasing their diameter. The combination of heat and attenuation action of the burner's high speed, gaseous blast causes the rods to be attenuated into fine fiber. At this point the technology becomes more ordinary in that it does not differ significantly from the conventional rotary glass fiber production techniques and also the cycled, "flame attenuation" technology. The thrust of the flame attenuation technology is that the high temperature glass extreme will pull on the fibers and thereby heat and stretch the fibers to their final desired size.

Accordingly, this new process and its associated apparatus combine the advantages of both the rotary and the flame attenuation technologies without their disadvantages. This process produces a fiber which is shot free since the extruded glass rods are already semi-soft and do not break. The high quality of the flame attenuation type glass fiber is retained, yet the energy consumption necessary to produce these fibers is diminished almost to the level of the rotary technology. Additionally, the service life of the rotary spinner disc is much increased due to its lower operating temperature. Finally, the through-put of the process can be adjusted to a quite low level which is ideally suited for the production of microfibers having a diameter of 2 microns or less.

BRIEF DESCRIPTION OF THE DRAWING

The drawing is a diagrammatic view of the apparatus of this invention showing in partial cut-away view of the various elements thereof.

DETAILED DESCRIPTION OF THE INVENTION

The following detailed description will be for one particular embodiment of this invention. The scope of the invention should be determined from the appended claims. For example, this specific embodiment includes a glass pellet pre heating subsystem which may not be necessary for all embodiments of the more general glass fiber production system. Additionally, the various types of feeders, burners, heaters, and the like may be replaced by their functional equivalents as different system requirements dictate.

Turning now to the drawing, in this preferred embodiment, glass marbles or pellets 12 are contained within a pellet bin 10. The dimensions of this bin are not particularly important, only that it be sufficiently large to contain an adequate reservoir of input glass material for the downstream requirements of the system. The bin 10 is supported at 24 and 26. At the bottom of the pellet bin is a heater in the form of a gas burner 22. The purpose of this heater is to cause a preheat condition in the glass pellets. The temperature is monitored by the action of a temperature sensing unit 14 which is within the pellet bin. The temperature information is conducted to a temperature controller 16 which in turn controls the supply of gas fuel 20 to the burner 22 by means of the controlled operation of a valve 18 which is driven by the temperature controller 16 which reacts to the temperature sensed within the bin 10 as shown.

In this particular embodiment the glass material is fed into the system at a rate of anywhere from 5 to 30 kilograms per hour. This flow rate is controlled by another subsystem which consists of a load cell/support 26 which senses the weight of glass material in the bin 10 and supplies this information to a controller 28. The controller 28 has been programmed to supply the glass material to the downstream portions of the system at a particular mass flow rate. The controller 28 will cause the insulated vibratory feeder 32 to deliver the specified flow rate by actuating its magnetic drive unit 30. The controller will do so by sensing the rate at which the weight of glass material within the bin is decreasing as a function of time and thereby adjusting the activity of the magnetic drive 30 to maintain the desired flow rate. A particular laboratory feeder utilized is a Centron feeder manufactured by the Erez Company of Erie, Pa. A screw type feeder could be utilized as well.

The glass input material is still in the form of marbles or pellets which generally will have size range of from about ⅛ inch to about ½ inch. The composition of the glass itself is not particularly critical. The temperature of the preheat in the bin 10 can be anywhere from ambient air temperature up to about 500° C.

The output of the vibratory feeder 32 is delivered to the input stack 36 of the spinner. The spinner itself is a relatively complicated piece of equipment which has several subsystems and associated auxiliary systems attached to it. The actual spinner which produces the glass fibers is the fiberizing disc 38 found towards the bottom of the assembly. This fiberizing disc is spun normally at a rate of about 2,000 to about 3,500 rpm by a spinner drive 37. This rotation rate is sufficient to cause the extrusion of the semi-soft glass marbles or pellets contained within the interior of the fiberizing disc 38. The fiberizing disc of course has a plurality of orifices on its peripheral wall and will be fabricated from a high nickel-chrome alloy. The disc diameter will generally be 8"-24". This large assembly also contains an attenuation burner 33 which receives a gas fuel supply through an input 35. Additional heat is supplied to the extruded glass rods by a high frequency heater 40. The particular heater used here was Forey high frequency having a 40 kilowatt capacity. The heater, however, is not necessarily operated at this full power level, but it is optimized to minimize the energy expenditure yet adequately heat the exterior walls of the fiberizing disc 38. Another auxiliary system which may be employed but is not shown in the drawing is a blowing crown. This subassembly supplies compressed air at about 100 to about 500 cubic feet per minute at a pressure of about 40 to about 100 psi. It is positioned slightly below the bottom of the lower holes in the fiberizing disc 38 and assists in the drawing out of the hot extruded glass fibers to attenuate their diameter to the desired extent. The gaseous blast which is downwardly directed onto the extruded glass fibers 42 is a high temperature gas flow originating largely from the attenuation burner 33. The glass flow rate is from about 300 to about 1000 nominal cubic meters per hour. The temperature of the disc itself will range from about 700° to about 1000° C. However, the gaseous temperatures immediately to the exterior to the outside of the periphery of the fiberizing disc 38 will be higher than this to the extent necessary to heat the extruded glass fibers 42 to a point where they may be efficiently stretched and their diameters thereby attenuated to the desired dimension.

The output extruded glass fibers 42 are collected in a fiber forming plenum 44. The plenum dimensions are about 3'-5' wide and 3'-6' long. The exhaust gases are collected in a suction box 46 and exhausted as shown by the arrow 48.

The system described herein was optimized to produce microglass fibers having diameters ranging from about 0.4 to about 2.0 microns. The length of these fibers was generally less than about 10 inches.

It is claimed:

1. A method for producing glass fibers comprising:
   conveying glass material in the form of pellets to the interior of a rapidly rotating spinner disc wherein the temperature of the disc is such as to maintain the glass material in a semi-solid state;
   extruding the glass material by centrifugal force through a plurality of orifices in the peripheral wall of the rotating spinner disc with the glass material still in the semi-solid state while within the orifices;
   subjecting the extruded glass material immediately after it has left the orifices to a relatively high velocity gas flow at a temperature in excess of the liquidus temperature of the glass such that the gas flow acts to stretch out the heated and softened extruded glass material into fibers thereby attenuating the diameter of the extruded fibers; and
   collecting and cooling the glass fibers.

2. The method of claim 1 wherein the spinner disc rotates at from about 2000 to about 3500 revolutions per minute.

3. The method of claim 1 wherein the method further comprises preheating the glass material prior to its conveyance to the spinner disc to a temperature less than about 500° C.

4. The method of claim 1 wherein the extruded glass is heated by the action of an annular gas burner which substantially encircles the exterior periphery of the spinner disc at a position upstream of the disc relative to the high velocity gas flow.

5. The method of claim 4 wherein the extruded glass and the exterior of the spinner disc are further heated by the action of a high frequency heater.

6. The method of claim 1 wherein the high velocity gas flow is downwardly directed.

7. The method of claim 6 wherein the high velocity gas flow is augmented by the action of a blowing crown which supplies compressed air to the high velocity gas flow in an encircling relationship to the exterior periphery of the spinner disc at a position slightly below the lowest orifices in the spinner disc.

8. The method of claim 6 wherein the gas velocity is from about 300 to about 1000 nominal cubic meters per hour.

9. The method of claim 1 wherein the size of the glass material conveyed to the spinner disc is from about ⅛ inch to about ½ inch.

10. The method of claim 1 wherein the temperature of the spinner disc itself is less than about 1000° C.

11. The method of claim 1 wherein the temperature of the spinner disc is from about 700° C. to about 1000° C.

* * * * *